United States Patent
Yang

(10) Patent No.: US 10,679,474 B2
(45) Date of Patent: *Jun. 9, 2020

(54) TACTILE FEEDBACK GUIDANCE DEVICE

(71) Applicant: Winston Yang, New York, NY (US)

(72) Inventor: Winston Yang, New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/560,645

(22) Filed: Sep. 4, 2019

(65) Prior Publication Data

US 2020/0005606 A1 Jan. 2, 2020

Related U.S. Application Data

(63) Continuation of application No. 15/915,875, filed on Mar. 8, 2018, now Pat. No. 10,431,056.

(60) Provisional application No. 62/468,854, filed on Mar. 8, 2017.

(51) Int. Cl.
| | |
|---|---|
| *G08B 6/00* | (2006.01) |
| *G01S 17/93* | (2020.01) |
| *G01S 17/88* | (2006.01) |
| *G01S 17/89* | (2020.01) |
| *G01S 7/481* | (2006.01) |
| *G01S 17/86* | (2020.01) |
| *G01C 19/00* | (2013.01) |
| *G01C 21/16* | (2006.01) |

(52) U.S. Cl.
CPC .............. *G08B 6/00* (2013.01); *G01S 7/4813* (2013.01); *G01S 17/86* (2020.01); *G01S 17/88* (2013.01); *G01S 17/89* (2013.01); *G01S 17/93* (2013.01); *G01C 19/00* (2013.01); *G01C 21/16* (2013.01)

(58) Field of Classification Search
CPC ............ G08B 6/00; G01S 17/93; G01C 19/00
USPC ........................................................ 340/407.1
See application file for complete search history.

(56) References Cited

U.S. PATENT DOCUMENTS

| | | | | |
|---|---|---|---|---|
| 2006/0290662 | A1* | 12/2006 | Houston | A63F 13/06 345/156 |
| 2010/0208045 | A1* | 8/2010 | Willmann | A61H 3/061 348/62 |
| 2013/0158928 | A1* | 6/2013 | Hogdal | G01C 21/20 702/104 |
| 2015/0097719 | A1* | 4/2015 | Balachandreswaran | G01B 11/002 342/147 |
| 2016/0127698 | A1* | 5/2016 | Mali | G01S 7/4813 348/62 |
| 2017/0024010 | A1* | 1/2017 | Weinraub | G06F 3/016 |
| 2017/0136380 | A1* | 5/2017 | Creedican | A63H 33/042 |

* cited by examiner

*Primary Examiner* — Jack K Wang
(74) *Attorney, Agent, or Firm* — Attentive Law; Paul Ratcliffe

(57) ABSTRACT

A tactile or haptic guidance device incorporates a LIDAR assembly and servo motor assembly or linear actuators to provide tactile feedback to the user. The LIDAR assembly determines obstacles in the path of the user and the microcontroller uses the LIDAR data to send a signal to the servo motor assembly or linear actuators, which will cause translational or rotational movement along one or more axes with appropriate amounts of force to provide tactile feedback to the user about objects in their path.

9 Claims, 5 Drawing Sheets

US 10,679,474 B2

TACTILE FEEDBACK GUIDANCE DEVICE

RELATED PATENT APPLICATION

The present application is a continuation of and claims priority to U.S. patent application Ser. No. 15/915,875 filed Mar. 8, 2018, the content of which is incorporated herein by reference in its entirety; this application and U.S. patent application Ser. No. 15/915,875 claims priority to U.S. Provisional Patent Application No. 62/468,854 filed Mar. 8, 2017, the content of which is incorporated herein by reference in its entirety.

BACKGROUND OF THE INVENTION

Field of the Invention

The present invention relates generally to a tactile feedback guidance device or walking assistant. More specifically, the invention relates to a walking wand which incorporates obstacle recognizing technology and one or more tactile feedback technologies and configurations to provide a walking wand with tactile responsive feedback to obstacles.

SUMMARY OF THE INVENTION

This summary of the invention is provided to introduce concepts in a simplified form that are further described in the detailed description of the invention. This summary is not intended to identify key or essential inventive concepts of the claimed subject.

The present invention provides a device and system for assisting an impaired vision user through use of a tactile feedback walking wand. The device makes use of one or more sensors, such as a Light Detection and Ranging ("LIDAR") assembly, to identify objects and obstacles in the range of the walking wand. As obstacles are identified the device responds to such obstacles by providing various tactile (rotational & lateral) responses based on the type, size, and location of the object received.

The present invention provides a tactile responsive guidance device, comprising: a housing having one or more recesses for accommodating one or more components of the device; a LIDAR assembly positioned within the housing at a front end for detecting objects in front of the first end of the housing; a controller; a multi-axis tactile feedback assembly; an Inertial Measurement Unit (IMU) for sensing the current orientation of the device, sensing any changes in movement of the device, and for communicating with the LIDAR assembly and the controller; a power supply for supplying power to the LIDAR assembly, the controller, the multi-axis tactile feedback assembly and the IMU; and the controller receiving signals from the LIDAR assembly and the IMU related to objects identified by the LIDAR, the current position of the device by the IMU; and the controller determines the amount of force to provide to the multi-axis tactile feedback assembly and communicates with the multi-axis tactile feedback assembly to initiate movement along each axis of the multi-axis tactile feedback assembly; and the multi-axis tactile feedback assembly positioned within a first recess of the one or more recesses, the recess configured to transmit forces exerted by multi-axis tactile feedback assembly to the housing to provide tactile feedback to the user of the device. The multi-axis tactile feedback assembly can be configured as a three-servo motor cube configuration. The three-servo motor cube configuration can be comprised of three rotational servo motors. The three-servo motor cube configuration can be comprised of three lateral actuators. The three-servo motor cube configuration can be comprised of a first servo motor affixed to a first face of the cube to provide rotation around an X axis, a second servo motor affixed to a second face of the cube to provide rotation around a Y axis, and a third servo motor affixed to a third face of the cube to provide rotation around a Z axis. The multi-axis tactile feedback assembly can be a six-servo motor cube configuration. The six-servo motor cube configuration can be comprised of three rotational servo motors and three translational servo motors. The six-servo motor cube configuration can be comprised of three rotational servo motors and three lateral actuators.

The present invention also provides a method for providing tactile feedback to a guidance device, the method comprising: receiving a signal from a lidar sensor of an object; determining the position of the device from an IMU of the device; determining movement of the device from the IMU; determining, by the processor, the appropriate force to supply in each of a plurality of axis to a multi-axis tactile feedback assembly; and transmitting a signal to the multi-axis tactile feedback assembly to provide a tactile response. The method further comprising the step of determining the appropriate force to supply a first servo motor, a second servo motor, and a third servo motor of the multi-axis tactile feedback assembly configured as a three-servo motor cube. The method further comprising the step of determining an appropriate rotation force and direction to supply a first servo motor affixed to a first face of the cube to provide rotation around an X axis, an appropriate rotation force and direction to supply a second servo motor affixed to a second face of the cube to provide rotation around a Y axis, and an appropriate rotation force and direction to supply a third servo motor affixed to a third face of the cube to provide rotation around a Z axis.

These and other objects, features, and/or advantages may accrue from various aspects of embodiments of the present invention, as described in more detail below.

BRIEF DESCRIPTION OF THE DRAWINGS

Various exemplary embodiments of this invention will be described in detail, wherein like reference numerals refer to identical or similar components or steps, with reference to the following figures, wherein.

DETAILED DESCRIPTION OF EXEMPLARY EMBODIMENTS

Particular embodiments of the present invention will now be described in greater detail with reference to the figures.

The present invention provides a device and system for assisting an impaired vision individual through use of a tactile feedback walking stick or walking wand. The device makes use of one or more sensors to identify objects and obstacles in the range of the walking stick. Those identified obstacles are identified by the device and the device responds to such obstacles by providing various tactile responses based on the type of object, size of the object, and location of the object received. The device includes multiple components including a power assembly, one or more servo motors in a logical configuration, an Inertial Measurement Unit ("IMU"), a controller, and a Light Detection and Ranging ("LIDAR") assembly.

Figure 1:
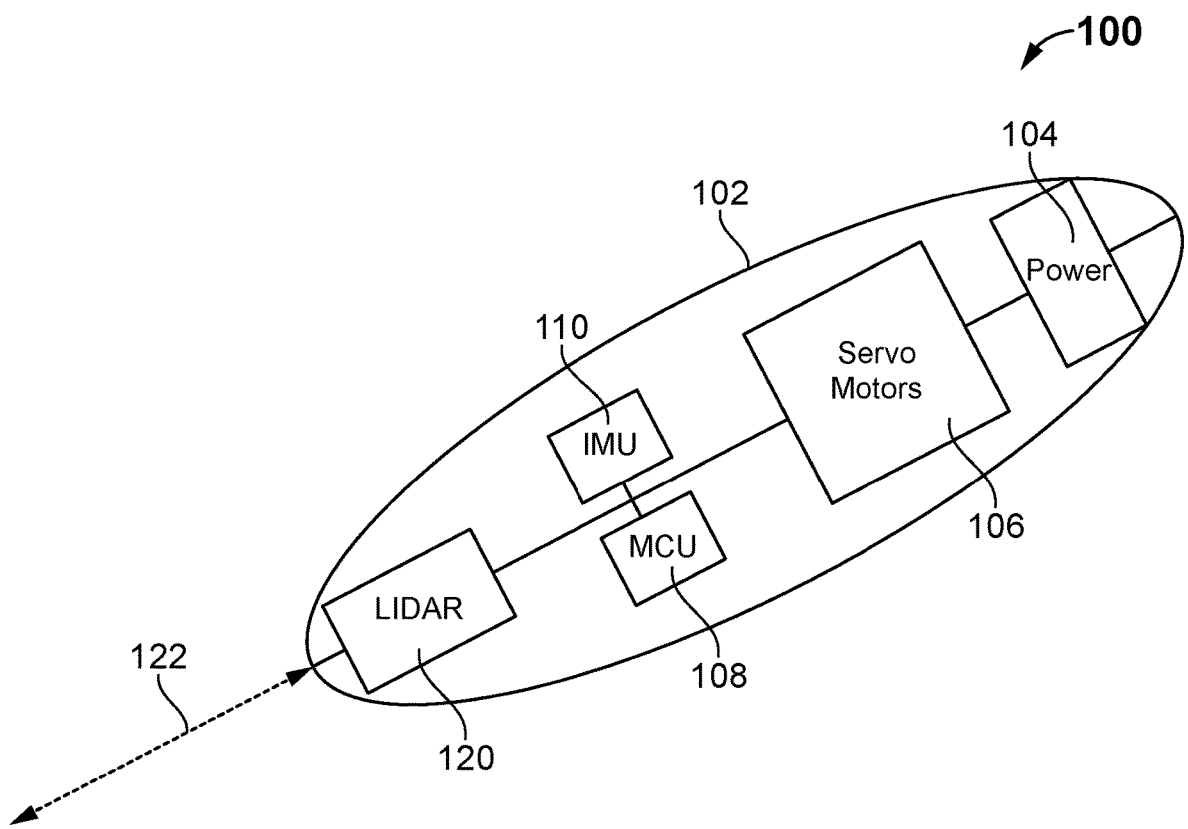
FIG. 1 illustrates an exemplary embodiment of tactile feedback guidance device.

As shown in FIG. 1, the present invention provides a tactile walking stick or tactile walking device 100 which is comprised of a housing 102 which houses a power unit 104, one or more servo motors 106, a micro controller or MCU 108, an Inertial Measurement Unit ("IMU") 110, and a Light Detection and Ranging ("LIDAR") unit 120. In operation, the power unit 104 provides power to the device 100 including the servo motors 106, the controller 108, the IMU 110, and the LIDAR unit 120. The power unit 104 may consist of one or more power cells or batteries, which may be configured as a single unit or as multiple units throughout the housing 102. In operation, the LIDAR unit 120 provides a remote sensing technology that can measure distance of an object by illuminating a target with a light beam (such as a laser light) and analyzing the reflected light that is received back by the LIDAR unit 120. The LIDAR unit may use ultraviolet visible or near infrared light and can target a wide range of materials including non-metallic objects, rocks, rain and many other objects. The LIDAR unit can make use of narrow laser beam light which can map physical features with high resolution.

In a preferred embodiment, a LIDAR unit will make use of 600-2000 nanometer lasers as they are relatively inexpensive. However, the unit may use a 1550 nanometer laser since such are eye safe. In one embodiment, a LIDAR-LITE may be used which uses a 905 nm laser transmitter designated Class 1 for use during all procedures of operation. This means that the laser is safe to look at with the unaided eye. However, it is very advisable to avoid looking into the beam and power the module off when not in use. LIDAR technology also has the ability to provide three-dimensional elevation mapping of the terrain which can be used by the assisted walking device 100 to identify changes in elevation on the terrain for which the user is walking.

As the LIDAR unit 120 transmits light or light waves 122 and receives the reflected light to identify objects within the site line or site range of the LIDAR unit and walking range of the assisted walking stick 100, the reflected light signals which identify the distance of objects and terrain mapping are sent to the controller 108. The controller 108 works with the IMU 110 and the servo motors 106 to identify appropriate activation and movement of the servo motors 106 to provide the appropriate tactile response. Specifically, the IMU 110 helps to determine the amount of inertial movement needed in each coordinate direction which is transmitted to the controller 108 which then controls the servo motors 106 to act accordingly.

The controller may ideally be a micro controller unit (MCU) which is used to process the signals from the LIDAR unit 120 as well as the IMU 110. The controller's primary function is to control the activation, deactivation, and intensity of each of the servo-motors 106 in the unit 100 based on inputs from the LIDAR 120 and IMU 110. The IMU 110 may contain a gyroscope, accelerometer or a magnetometer in order to sense the device's current orientation and any changes or movement in the walking stick 100 based on the user's movement and use of the device 100.

By way of example, if the LIDAR unit 120 identifies an object (through reflected light signals 122) to the left of the walking stick 100, and the walking stick 100 is being moved laterally to the left, the LIDAR unit 120 in conjunction with the IMU 110 would send a signal to the controller (or MCU) 108. The signal would include the relevant data for the MCU 108 to determine the appropriate response. The MCU 108 would then provide a signal to the servo motor 106 to provide the correct tactile response.

In this example, the two pieces of time series data fed in parallel into the MCU 108 are: (1) Rotational data where the IMU 110 gyroscope provides the rate of rotation as well as the orientation to the MCU 108 where the MCU 108 then knows how fast or slowly the wand device 100 is moving to the left, (2) acceleration data to capture the acceleration of the device minus gravity, (3) magnetometer data to provide absolute orientation and (4) depth data where the LIDAR 120 provides depth information at a point in time to the MCU 108. While moving the walking stick to the left, the IMU 110 gyroscope would provide a constant angular velocity, but upon hitting the edge of the object, while the angular velocity may be the same (depending on how fast the user is using the wand 100 to scan the surface), the LIDAR 120 would measure an immediate decrease in distance in the case of a sharp-edged object.

The MCU 108 would combine the information and know that due to a sharp change in distance while moving to the left, that there must be an object to the left. The MCU would then signal the servo motor 106 to provide an output result in clockwise rotation in the servo motors 106 along the Z-axis which would provide rotation in the walking stick 100 to the right.

The controller 108 would then send signals to the servo motors 106, or to a single server motor to control the rotation, duration, and strength of the tactile feedback to the user. In the event a large object, such as a wall, is identified to the left the walking stick would then provide a tactile response which directs the user's hand to the right pulling the user away from the wall that the user is close to on the user's left and the left of the walking device 100. The tactile response or the servo motors 106 may be in multiple axis and directions and may include multiple types of responses. For example, if a user is getting close to an object but is not set to run into the object the device may provide a slight tactile response in the opposite direction of the object such that the user knows they are to steer themselves slightly in the opposite direction. However, if the user is headed in a direction such that they will impact an object, the device may both provide a tactile response in the opposite direction or opposite axis of the object but it also may provide a rotational tactile response indicating that the user is to turn quickly and/or stop.

Another example may be a user walking towards the edge of a subway track, potentially falling into the track. In this example, the user may not be scanning the walking stick 100 left and right, but holding it still, pointing it in front of him/her, so that the walking stick 100 is pointing in front of him by a few feet (i.e. 3 feet). The IMU 110 would maintain constant orientation with zero rotational velocity. As the user approaches the edge, the LIDAR 120 which previously measured 3 feet would increase to a larger distance (i.e., 10 feet which is the distance to the bottom of the tracks). In such an instance, the walking stick 100 would behave by tilting and dipping the front tip of the walking stick downwards, which is achieved through servo clockwise actuation along the X-axis.

Further, in addition to a tactile response being in one or more axis of directions or providing a rotational tactile response, the unit may provide a response with varying intensity levels such that a low intensity level might indicate the user is near, but not close to, an object and a harsh or heavy vibrational response indicates the user is extremely close to an object.

The servo motor 106 may comprise one or more servo motors in various configurations. Such configurations might include three servo motors with each servo motor along a specific axis (such as the XYZ axis) of the device 100. In this configuration, the controller 108 can control the intensity of the servo motors in each axis to provide the appropriate tactile response sought based on the observed obstructions.

Figure 2A:
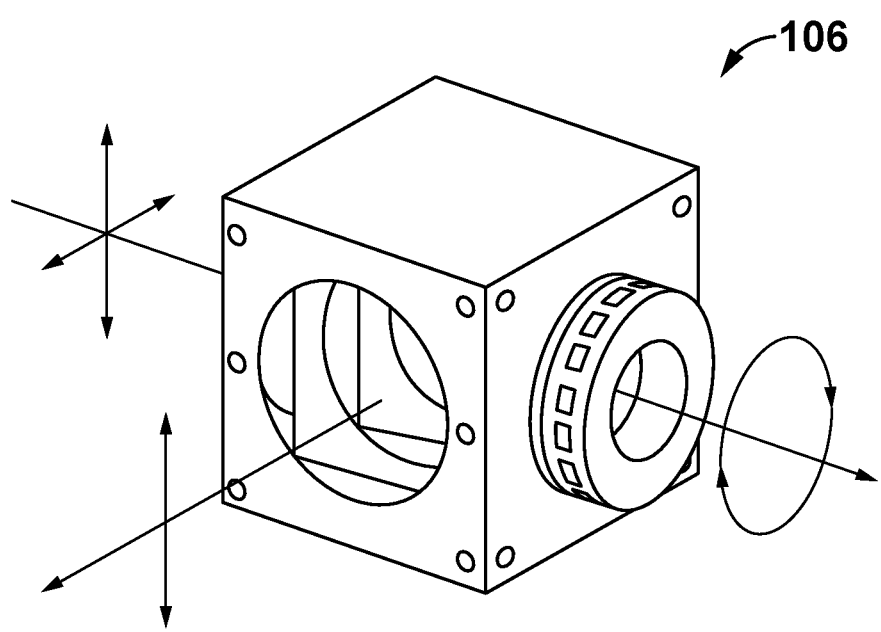
FIG. 2A illustrates an exemplary embodiment of a tactile servo motor configuration.

As seen in FIG. 2A, an additional configuration is provided which depicts a six-servo motor 106 configuration with the axis of each servo motor representing the six planes of a cube. The six-servo motor configuration 106 have the servos contained within the housing of the cube 106. The six-servo configuration will be described in more detail in conjunction with FIG. 2C. Such a configuration would allow greater control and detail of the tactile feedback device within all directions of the device to provide an even greater level of tactile feedback response.

Figure 2B:
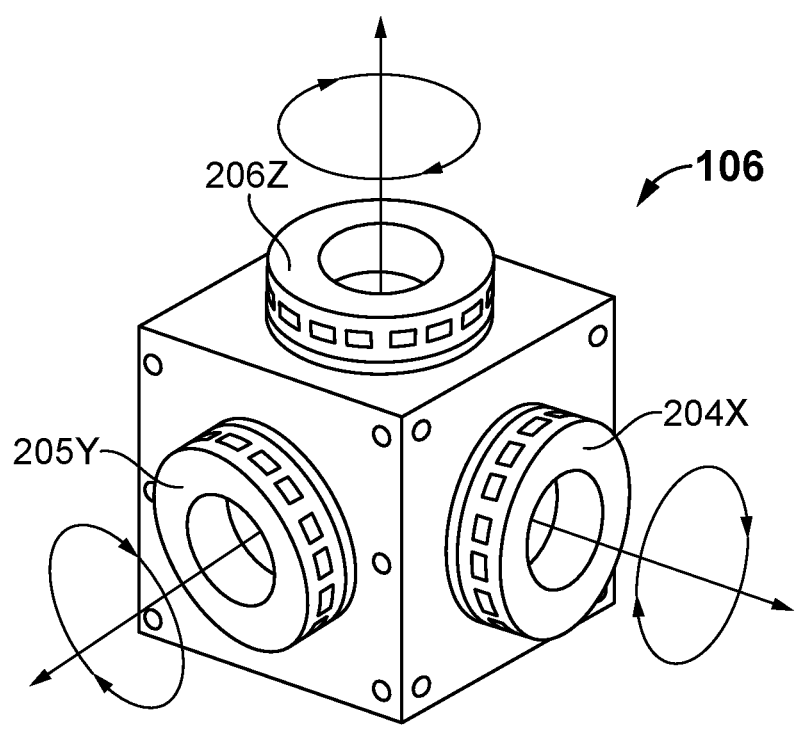
FIG. 2B illustrates an alternative exemplary embodiment of the tactile servo motor configuration.
Figure 2C:
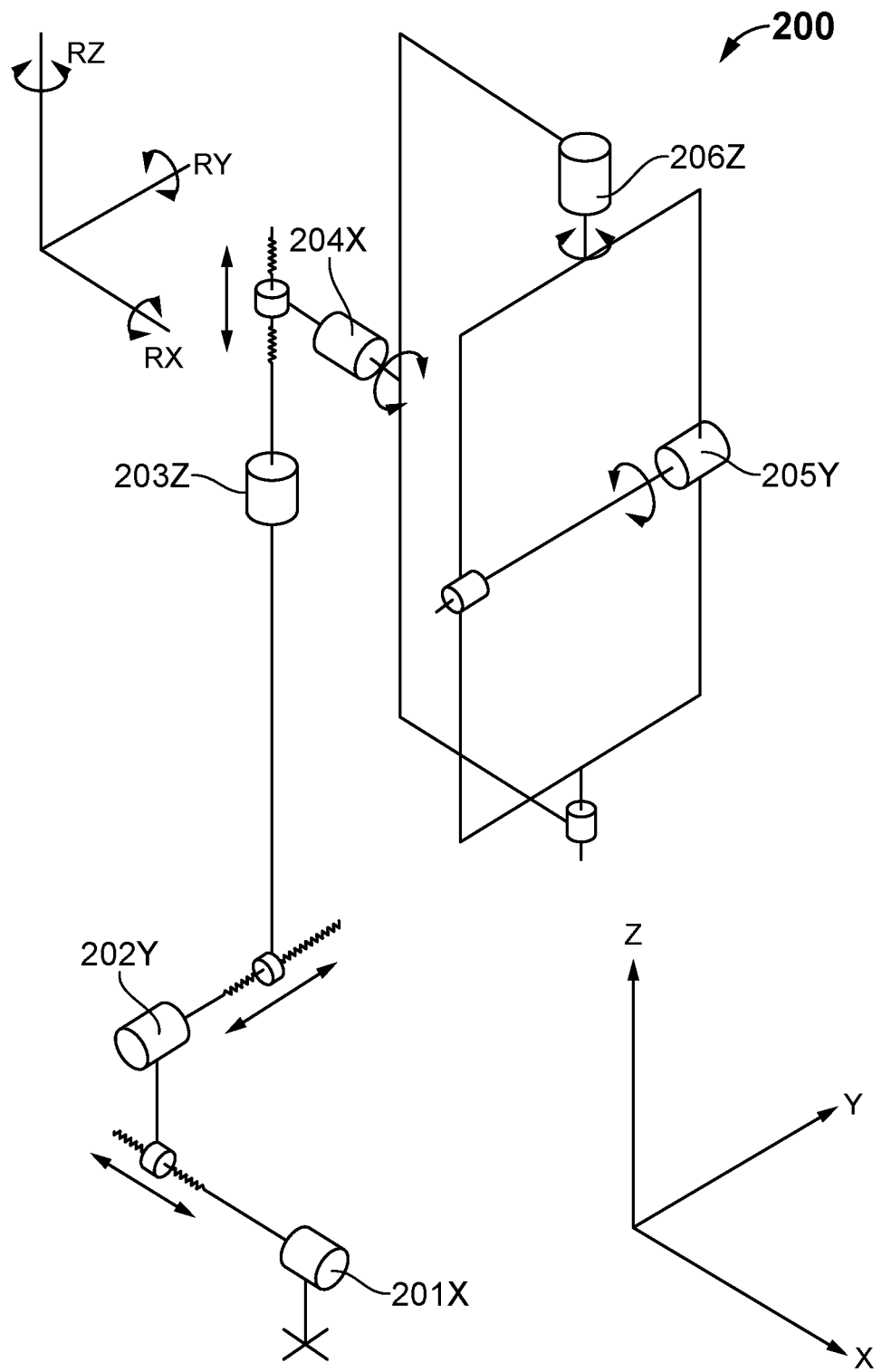
FIG. 2C illustrates a six-servo motor configuration.

As seen in FIG. 2B, an alternative configuration is provided that depicts a three-servo motor cube 106 configuration. The three servo motors 204X, 205Y, and 206Z may extend beyond the plane of the cube on the X, Y and Z axis. Servo motor 204X representing rotation of the servo motor along the X axis. Servo motor 205Y represents the rotation of the servo motor along the Y axis. Servo motor 206Z represents the rotation of the servo motor along the Z axis. Servo motor 201X, 202Y and 203Z, as seen in FIG. 2C, are not required in this second embodiment.

In the embodiments depicted in FIGS. 2A and 2B, each servo motor executes a single translational or rotational movement relative to the device. As seen in FIG. 2C, the six-servo motor configuration 200 allows motion in six degrees of movement to simulate the entire range of motion in the tactile walking device 100. Servo motor output may be translated in linear actuation or rotational actuation. Servo Motor 201X, for example, may be fixed rigidly to one face of the cube or to the housing and allows for translational movement along the X axis. Servo motor 202Y and it corresponding bearing or elements may be fixed to another face of the cube and may provide translational movement along the Y axis. Servo motor 203Z and its corresponding bearings or elements may provide translational movement along the Z axis and may be connected to or along a 3rd face of the cube. Servo Motor 204X and it corresponding bearings may be mounted on a fourth face or a rectangular frame and is adapted for rotation about a horizontal axis (the X axis). Servo Motor 205Y and its corresponding elements may be mounted or fixed on a fifth face or a rectangular frame and is adapted for rotation about a vertical axis (the Y axis). Servo Motor 206Z and its corresponding elements may be mounted on a 6th face or on an interior frame and corresponds with a second horizontal axis (the Z axis).

In an additional configuration, the servo motor 201X, 202Y, and 203Z may be swapped out for micro linear actuator motors that can operate on their own, affixed to the housing, the servo cube 106, or internal to the servo cube 106. The linear actuators are capable of providing a push and pull force along their corresponding axes.

In operation, each servo motor 204X, 205Y, and 206Z can use rotation to enable 3 degrees of movement. However, each servo motor 204X, 205Y, and 206Z can also act alone or in combination to counter rotational movement of one of the servo-motors to enable the device to exhibit six degrees of movement (rotational and translational movement along the X, Y, Z axis). The rotations are identified as RX, RY and RZ, and correspond to the operation of the servo motor 204X, 205Y and 206Z.

Figure 3:
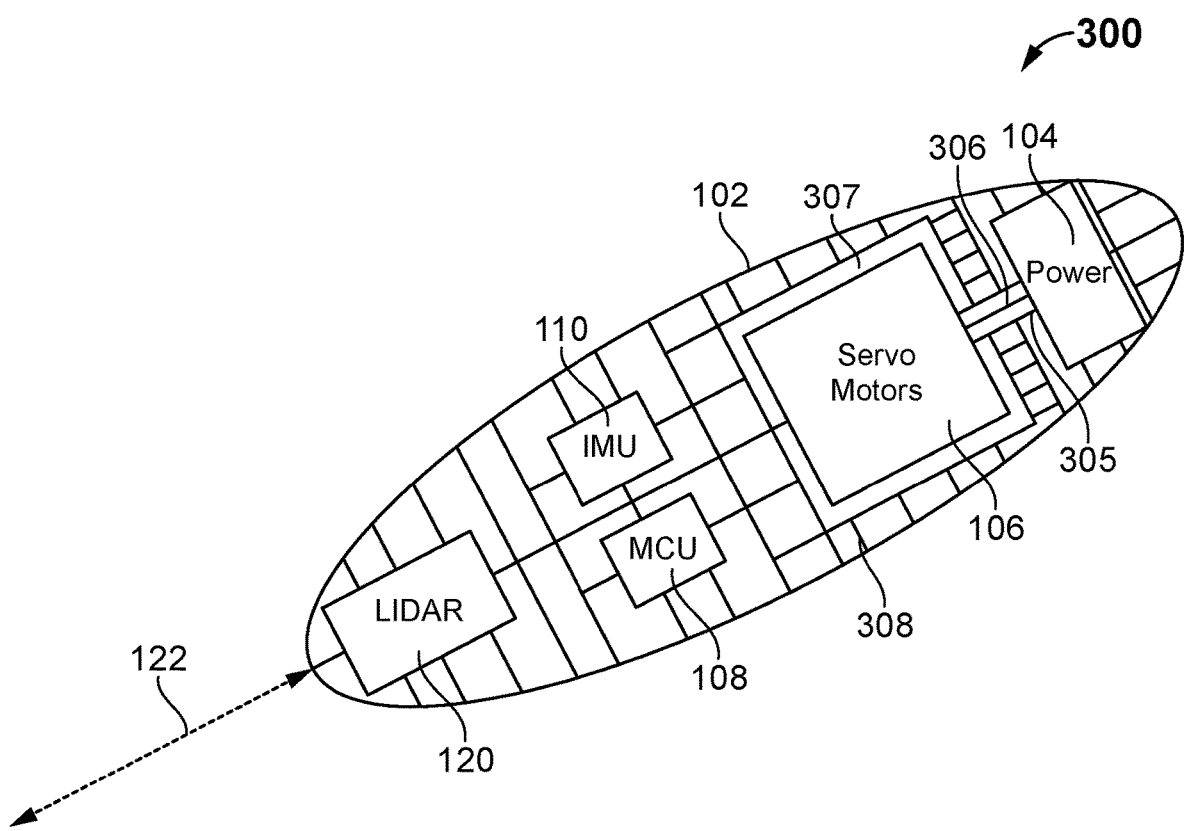
FIG. 3 illustrates ribs and channels of the tactile feedback walking wand.

FIG. 3, provides an additional embodiment of the present invention. The tactile walking stick or tactile walking device 300 is comprised of an ergonomic style housing 102 which houses a power unit 104, one or more servo motors 106, a micro controller or MCU 108, an Inertial Measurement Unit ("IMU") 110, and a Light Detection and Ranging ("LIDAR") unit 120. The unit 300 may include or may employ multiple LIDAR units, a LIDAR unit 120 with multiple transmitters and receivers (sensors), or a LIDAR unit 120 using an array for detecting objects and terrain in a wider field or range. As mentioned, the housing 102 may be in a molded and comfortable ergonomic design.

A clam shell style housing 102 may be used and may be molded with walls and ribs 308 which help to form channels 305 and recesses 307. The channels 305 may be used to route connections (i.e. power 306) between components. The walls and ribs 308 provide recesses 307 and spacing for fitting each component 104, 106, 108, 110, 120. For example, the servo cube 106 may sit within recess 307 formed by ribs 308. The claim shell housing 102 and recesses 307, would encase the cube 106 so that each face or axis of rotation (see FIGS. 2A and 2B) has contact with the housing 102. The cube 106 within the recess 307 while still contacting the walls and ribs 308 enable the force exerted by the servo-cube 106 to extend to the housing 102 and thus exert its tactile effect on the user.

The features, structures, or characteristics of the invention described throughout this specification may be combined in any suitable manner in one or more embodiments. For example, the usage of "one embodiment," "some embodiments," "preferred embodiment," "certain embodiments," or other similar language, throughout this specification refers to the fact that a particular feature, structure, or characteristic described in connection with the embodiment may be included in at least one embodiment of the present invention. Thus, appearances of the phrases "one embodiment," "some embodiments," "a preferred embodiment," "certain embodiments," or other similar language, throughout this specification do not necessarily all refer to the same group of embodiments, and the described features, structures, or characteristics may be combined in any suitable manner in one or more embodiments Further, while certain embodiments have been described, these embodiments have been presented by way of example only and are not intended to limit the scope of the present disclosures. Indeed, the novel methods, apparatuses and systems described herein can be embodied in a variety of other forms; furthermore, various omissions, substitutions and changes in the form of the methods, apparatuses and systems described herein can be made without departing from the spirit of the present disclosures. The accompanying claims and their equivalents are intended to cover such forms or modifications as would fall within the scope and spirit of the present disclosures. For example, this technology may be structured for cloud computing whereby a single function is shared and processed in collaboration among a plurality of apparatuses via a network.

I claim:

1. A tactile responsive guidance device, comprising:
   a. a LIDAR sensor for detecting objects in front of the device;
   b. a controller;
   c. a three-servo motor cube assembly;

d. an inertial measurement unit for sensing the current orientation of the device, sensing any changes in movement of the device, and for communicating with the controller; and
e. a power supply for supplying power to the LIDAR sensor, the controller, the three-servo motor cube assembly and the inertial measurement unit;
f. wherein the controller receives a LIDAR signal from the LIDAR sensor related to at least one object detected by the LIDAR sensor and a device position signal from the inertial measurement unit;
g. wherein the controller determines the amount of force to provide to the three-servo motor cube assembly and communicates with the three-servo motor cube assembly to initiate movement by the three-servo motor cube assembly; and
h. wherein the three-servo motor cube assembly is configured within the device to provide tactile feedback to the user of the device.

2. The device according to claim 1, wherein the three-servo motor cube assembly is comprised of at least one rotational servo motor.

3. The device according to claim 1, wherein the three-servo motor cube assembly is comprised of at least one translational servo motor.

4. The device according to claim 1, wherein the three-servo motor cube assembly is comprised of at least one lateral actuator.

5. A tactile responsive guidance device, comprising:
a. a LIDAR sensor for detecting objects in front of the device;
b. a controller;
c. an inertial measurement unit for sensing the current orientation of the device, sensing any changes in movement of the device, and for communicating with the controller;
d. a first servo motor, a second servo motor and a third servo motor; and
e. a power supply for supplying power to the LIDAR sensor, the controller, the inertial measurement unit, the first servo motor, the second servo motor, and the third servo motor;
f. wherein the controller receives a LIDAR signal from the LIDAR sensor related to at least one object detected by the LIDAR sensor and a device position signal from the inertial measurement unit;
g. wherein the controller determines a first force to supply the first servo motor, a second force to supply the second servo motor, and a third force to supply the third servo motor, wherein the first servo motor, second servo motor, and the third servo motor are configured as a multi-axis tactile feedback assembly; and
h. wherein the multi-axis tactile feedback assembly is configured within the device to provide tactile feedback to the user of the device.

6. The device according to claim 5, wherein at least one of the first servo motor, the second servo motor or the third servo motor is a rotational servo motor.

7. The device according to claim 5, wherein at least one of the first servo motor, the second servo motor or the third servo motor is a translational servo motor.

8. The device according to claim 5, wherein at least one of the first servo motor, the second servo motor or the third servo motor is a lateral actuator.

9. A method for providing tactile feedback to a guidance device, the method comprising:
a. receiving a signal from a LIDAR sensor of an object;
b. determining the position of the device from an inertial measurement unit;
c. determining movement of the device from the inertial measurement unit;
d. determining, by a device processor, a first force to supply a first servo motor, a second force to supply a second servo motor, and a third force to supply a third servo motor, wherein the first servo motor, second servo motor, and the third servo motor are configured as a multi-axis tactile feedback assembly; and
e. transmitting a signal to the multi-axis tactile feedback assembly to provide a tactile response based on the first force, the second force, and the third force.

* * * * *